(12) United States Patent
Smirnov et al.

(10) Patent No.: US 8,195,312 B2
(45) Date of Patent: Jun. 5, 2012

(54) MULTI-MODE CONTROL LOOP WITH IMPROVED PERFORMANCE FOR MASS FLOW CONTROLLER

(75) Inventors: Alexei V. Smirnov, Fort Collins, CO (US); Michael Lynn Westra, Windsor, CO (US); Demitri Widener, Windsor, CO (US)

(73) Assignee: Hitachi Metals, Ltd, Tokyo (JP)

( * ) Notice: Subject to any disclaimer, the term of this patent is extended or adjusted under 35 U.S.C. 154(b) by 435 days.

(21) Appl. No.: 12/549,142

(22) Filed: Aug. 27, 2009

(65) Prior Publication Data

US 2011/0054702 A1    Mar. 3, 2011

(51) Int. Cl.
G05B 13/02 (2006.01)
G05D 7/00 (2006.01)
G05D 11/00 (2006.01)
G05D 11/02 (2006.01)
G05D 11/16 (2006.01)
G05D 3/12 (2006.01)
G05D 5/00 (2006.01)
G05D 9/00 (2006.01)

(52) U.S. Cl. ............ 700/45; 700/37; 700/282; 700/285; 700/292

(58) Field of Classification Search ............. 700/45, 700/282, 265, 285, 37, 292
See application file for complete search history.

(56) References Cited

U.S. PATENT DOCUMENTS

| | | |
|---|---|---|
| 5,271,389 A | 12/1993 | Isaza et al. |
| 5,911,238 A * | 6/1999 | Bump et al. ............... 137/487.5 |
| 6,439,254 B1 * | 8/2002 | Huang et al. ................ 137/10 |
| 6,445,980 B1 * | 9/2002 | Vyers ......................... 700/282 |
| 6,865,520 B2 * | 3/2005 | Tariq .......................... 702/190 |
| 6,962,164 B2 * | 11/2005 | Lull et al. ..................... 137/2 |
| 7,073,392 B2 * | 7/2006 | Lull et al. .................... 73/861 |
| 7,216,019 B2 * | 5/2007 | Tinsley et al. .............. 700/282 |
| 7,273,063 B2 * | 9/2007 | Lull et al. .................... 137/12 |
| 2002/0198668 A1 | 12/2002 | Lull et al. |
| 2006/0235627 A1 * | 10/2006 | Dykstra et al. ................ 702/23 |
| 2007/0276545 A1 * | 11/2007 | Smirnov ..................... 700/282 |
| 2007/0288180 A1 * | 12/2007 | Lull et al. ..................... 702/50 |
| 2008/0165613 A1 * | 7/2008 | Dykstra ....................... 366/17 |

FOREIGN PATENT DOCUMENTS

EP    0054501 A1    6/1982

OTHER PUBLICATIONS

Ramachandran, Mani, "International Search Report and Written Opinion re Application No. PCT/US10/046422 dated Nov. 23, 2010", Published in: AU.

* cited by examiner

*Primary Examiner* — Ronald Hartman, Jr.
(74) *Attorney, Agent, or Firm* — Neugeboren O'Dowd PC; Sean R. O'Dowd

(57) ABSTRACT

One embodiment of the invention comprises a mass flow controller comprising a digital controller, a valve, and a sensor. The digital controller is adapted to implement a control loop having a proportional signal modifier in series with an integral signal modifier. The integral signal modifier is adapted to receive a combination signal and output an integrated signal. The valve is adapted to receive the integrated signal and adjust a valve opening in accordance with the integrated signal. The sensor is adapted to output a measured flow rate signal indicative of an actual fluid flow rate in the mass flow controller. The measured flow rate signal is received by the proportional signal modifier and used in conjunction with a setpoint signal to determine the error signal.

17 Claims, 6 Drawing Sheets

MULTI-MODE CONTROL LOOP WITH IMPROVED PERFORMANCE FOR MASS FLOW CONTROLLER

FIELD OF THE INVENTION

The present invention generally relates to a mass flow controller, or "MFC". In particular, but not by way of limitation, the present invention relates to a control system adapted to substantially decrease flow rate overshoot in a MFC.

BACKGROUND OF THE INVENTION

MFCs are often used across multiple fluid types and applications. Furthermore, it is often required that the MFCs be adapted to quickly respond to changes in the desired fluid mass flow rate, or "setpoint". For example, many applications only operate properly when, upon a step change in the setpoint, the MFC outputs an accurate mass flow rate of fluid and prevents overshoot of the new flow rate. However, it is often difficult to accurately determine the fluid flow rate and prevent overshoot for step changes in setpoint because performance of the MFC varies greatly among fluid type, fluid pressure, and setpoint value.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In order to provide an accurate response to step changes in the setpoint so that overshoot of the setpoint is prevented, one embodiment of the present invention comprises a mass flow controller having a digital signal control system adapted to prevent overshoot. In order to prevent overshoot, one digital signal control system is comprised of a control loop having a proportional signal modifier with a differentiation module in series with an integral signal modifier. The proportional signal modifier is adapted to apply a proportional modification to a measured flow rate signal emitted from a flow rate sensor, and subsequently emit a proportionally modified signal to a signal adder. The adder combines the signal emitted from the proportional signal modifier with an error signal to create a combined signal (with the error signal comprising the difference between the setpoint and the measured flow rate). The combined signal is received by the integral signal modifier, which integrates the combined signal and outputs an integrated signal adapted to be received by a valve. The valve then adjusts a valve opening in accordance with an integrated signal level, thereby controlling the mass flow rate of fluid through a main flow line of the MFC. The flow rate sensor is adapted to measure the actual flow rate of fluid through the main flow line and output the measured flow rate signal.

Another embodiment of the invention comprises a method of adjusting a flow rate of fluid in a mass flow controller in order to prevent flow rate overshoot. One method is comprised of receiving an original set point value and subsequently changing the set point value to a new set point value. A difference between the new set point value and a measured fluid flow rate is determined to obtain an error signal. A signal adder combines the error signal with a signal emitted from a proportional signal modifier to obtain a combination signal. The signal emitted from the proportional signal modifier is obtained after applying differentiation and a proportional modifier to a measured flow rate signal. An integral signal modifier is applied to the combination signal and outputs an integrated signal, which is received by a valve and used to adjust a valve opening accordingly. Through application of the proportional and integral signal modifiers in this manner, flow rate overshoot of the new setpoint value is prevented.

An additional embodiment type is a mass flow rate digital controller. The digital controller is adapted to receive and output electrical signals to prevent overshoot of a desired mass flow rate in an MFC. One digital controller comprises at least one input. The at least one input is adapted to receive a setpoint signal and a sensor signal. The digital controller further comprises a proportional signal modifier having a differentiation module. The proportional signal modifier with a differentiation module is adapted to receive the sensor signal and output a proportional signal. A first signal adder in the controller is adapted to receive the setpoint signal and sensor signal and output an error signal. A second adder is adapted to receive the error signal and the proportional signal and output a combination signal. The combination signal is adapted to be received by an integral signal modifier. The integral signal modifier outputs an integrated signal. The integrated signal is then output by the digital controller, received by, and used to adjust, a valve, preventing overshoot of the flow rate.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Figure 1:
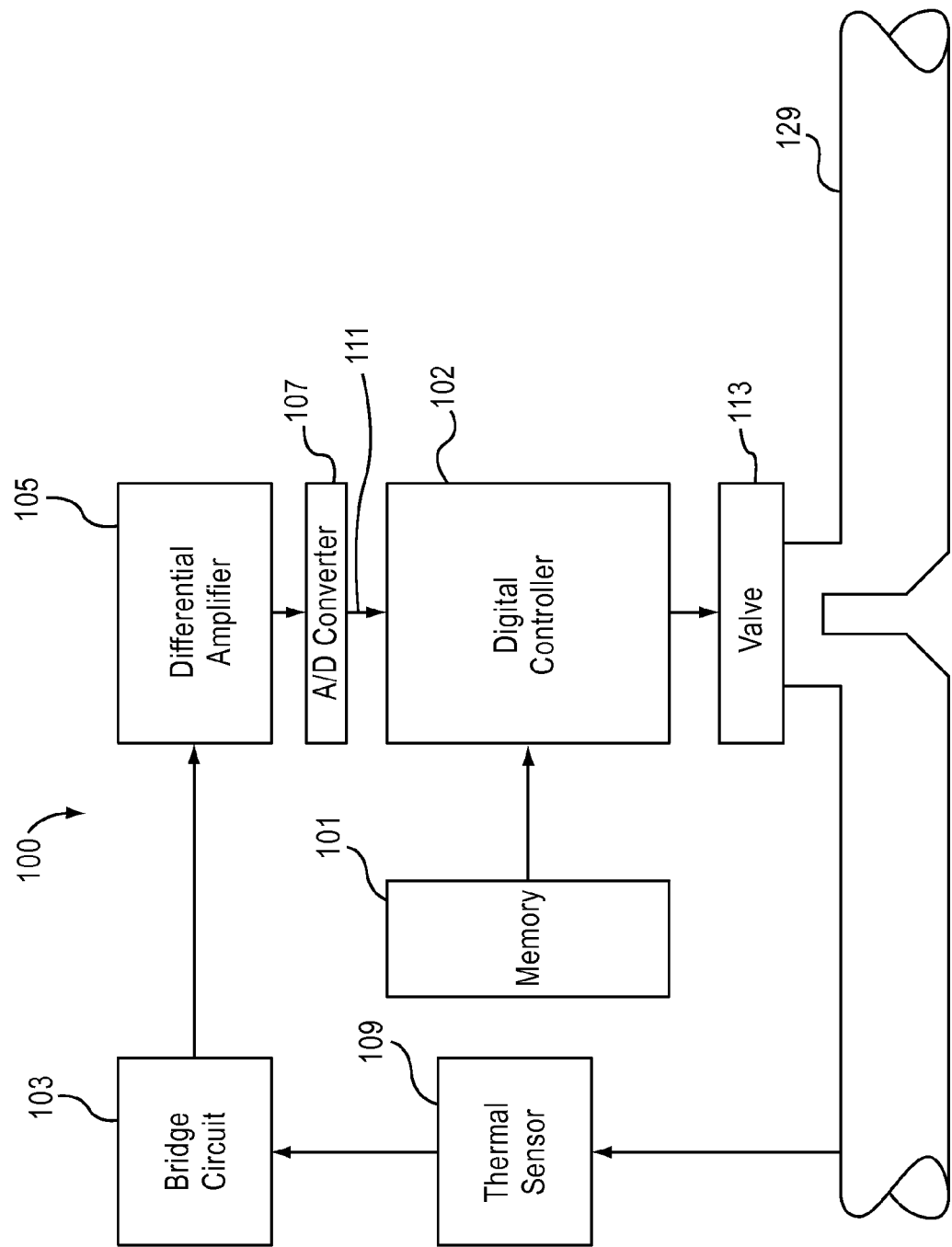
FIG. 1 is a schematic representation of a mass flow controller in accordance with an illustrative embodiment of the invention.

Referring now to the drawings, where like or similar elements are designated with identical reference numerals throughout the several views where appropriate, and referring in particular to FIG. 1, shown is a mass flow controller 100 adapted to substantially prevent flow rate overshoot upon a step change occurring in the setpoint. As seen in FIG. 1, included in one MFC 100 is a digital controller 102. The controller 102 may be a modified PI controller in one embodiment. Furthermore, the controller 102 may be comprised of a processing unit, e.g., a processor, adapted to receive one or more input signals and output one or more output signals, with the one or more output signals adapted to modify a control valve 113 in response to the one or more input signals. The digital controller 102 may also be referred to as a digital control system.

The MFC 100 may also be comprised of a memory device 101 that may store information for use by the controller 102. Although the memory device 101 may comprise a portion of the controller 102, it is shown as separate from the controller 102 in FIG. 1. Similarly, additional elements in FIG. 1 may be shown as separate elements in FIG. 1, but in some embodiments, the elements in FIG. 1 may be combined with one or more other elements in FIG. 1. Similarly, other elements in FIG. 1 and in the other figures may comprise elements adapted for combination with one or more additional elements in the same or other figures.

Figure 2:
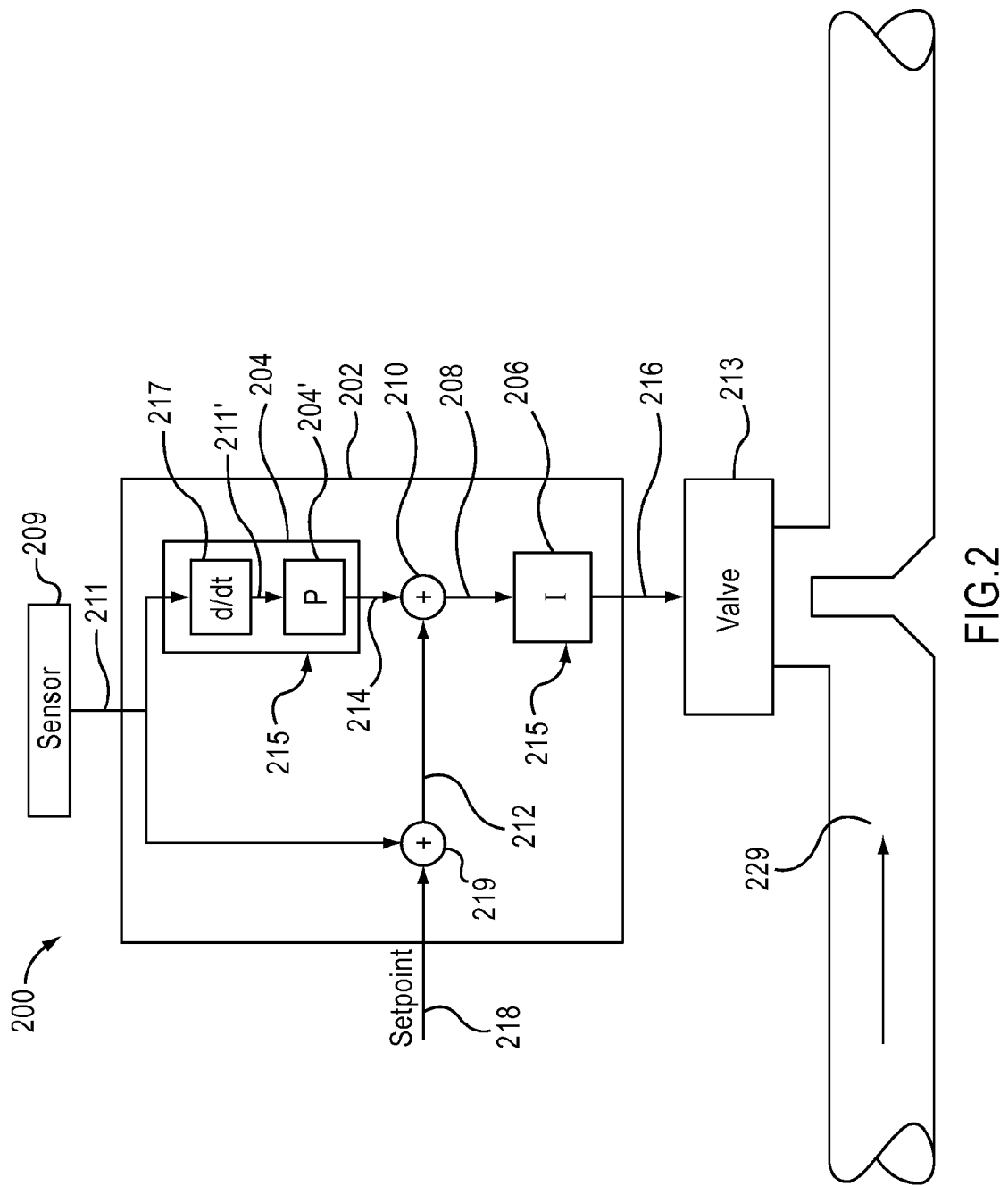
FIG. 2 is a schematic representation of a digital controller electrically coupled to a mass flow controller sensor and valve in accordance with an illustrative embodiment of the invention.

As seen in FIG. 2, one digital controller 202 may be comprised of a control sequence having one or more signal modifiers 215. The control sequence may also be referred to as a control loop. One signal modifier 215 may comprise a proportional signal modifier 204 and one may comprise an integral signal modifier 206. In one embodiment, a sensor 209 such as, but not limited to, a thermal sensing device, may be adapted to provide the controller 202 with an input signal. The input signal may comprise a measured flow rate signal 211 indicative of a mass flow rate of a fluid in a main flow line 229. As seen in FIG. 1, one sensor 109 may be electrically coupled to the controller 102 through a bridge circuit 103, differential amplifier 105, and analog/digital converter 107. Through the use of the bridge circuit 103, differential amplifier 105, and converter 107, the controller 102 is provided with the measured flow rate signal 111. For example, the bridge circuit 103 may be adapted to receive one or more signals from the sensor 109, the differential amplifier 105 may be adapted to (i) receive a signal output by the bridge circuit 103 and (ii) provide a differential amplifier signal to the analog-digital converter 107, and the controller 102 may be adapted to receive a digital signal from the analog-digital converter 102.

Returning to FIG. 2, the measured flow rate signal 211 may be combined with a setpoint signal 218 through a first adder 219 to produce an error signal 212. In one embodiment, the setpoint signal 218 may comprise a desired fluid flow rate, and may be input by a user and saved in the memory 101, as shown in FIG. 1. The measured flow rate signal 211 is also seen in FIG. 2 as being received by a proportional signal modifier 204. One proportional signal modifier 204 may be comprised of a differentiation module 217 adapted to apply a differentiation modifier to the measured flow rate signal 211 prior to applying a proportional modifier 204' The proportional modifier 204' may also be referred to as a proportional module. The differentiation module 217 may also be separate from the proportional signal modifier 204. As seen from FIG. 2, since the differentiation module 217 is in series with the integral signal modifier 206, the differentiating effect applied to the measured flow rate signal 211 by the differentiation module 217 will be effectively canceled by the integral signal modifier 206, leaving only a proportional modification in an integrated signal 216 received by a valve 213.

In one embodiment, the proportional signal modifier 204 is in series with an integral signal modifier 206. The integral signal modifier 206 may be adapted to receive a combination signal 208 from a second signal adder 210, with the combination signal 208 comprising the error signal 212 and a proportional signal 214 output by the proportional signal modifier 204. The proportional signal 214 may also be referred to as a proportional modifier output signal. The error signal 212 may be comprised of the difference between the setpoint signal 218 and the measured flow rate signal 211, or the difference in desired flow rate to actual flow rate. The integral signal modifier 206 is adapted to apply an integral modifier to the combination signal 208 and output the integrated signal 216 to the valve 213. Through application of the PI modifiers 204, 206 and the differentiation module 217 in such a manner, the valve 213 is adapted to receive the integrated signal 206 and adjust a valve opening so that overshoot of a desired flow rate is prevented.

In one embodiment, when the setpoint signal 218 is changed from a first setpoint signal to a second setpoint signal, the error signal 212 changes from a first error signal to a second error signal. By changing the error signal value, the combination signal 208 received by the integral signal modifier 206 is also changed. Upon integrating this new combination signal 208, a new integral signal 216 is provided to the valve 213, thereby changing the actual fluid flow rate in the mass flow line 229 from a first actual fluid flow rate to a second actual fluid flow rate.

Figure 4:
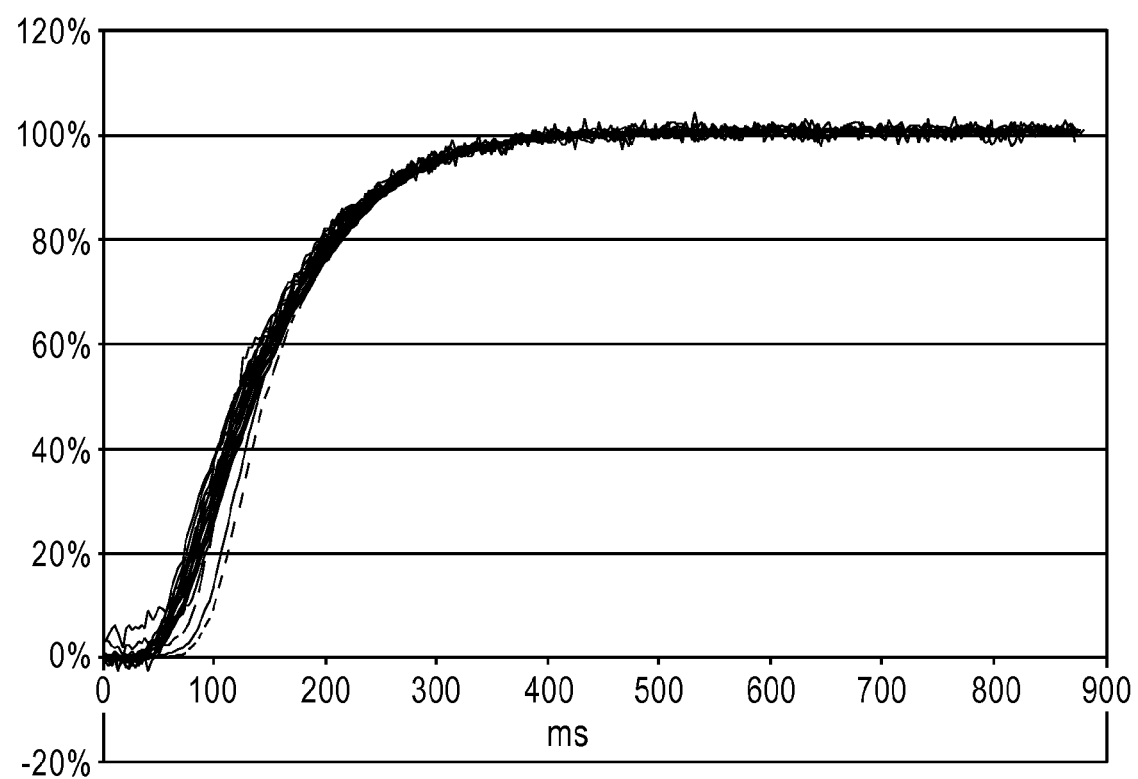
FIG. 4 is a graph showing the change in actual flow rate after a step change in setpoint occurs in a MFC in accordance with an illustrative embodiment of the invention.

FIG. 4 shows a percentage change in actual fluid flow rate from a first setpoint value (0%) to a second setpoint value (100%) across multiple MFC operating conditions using the MFC 100, 200 and the digital controller 102, 202 shown in FIGS. 1, 2, and elsewhere throughout the application. The multiple operating conditions in FIG. 4 comprise various setpoint values/error signals across varying fluid types and pressures. As seen, a similar rate of change in the mass flow rate occurs across all operating conditions and overshoot of the second setpoint value is substantially prevented. Furthermore, the mass flow rate is substantially stable across all operating conditions after a period of time of about 400 ms. The y-coordinate value in FIG. 4 is the percentage change between setpoint values.

Figure 5:
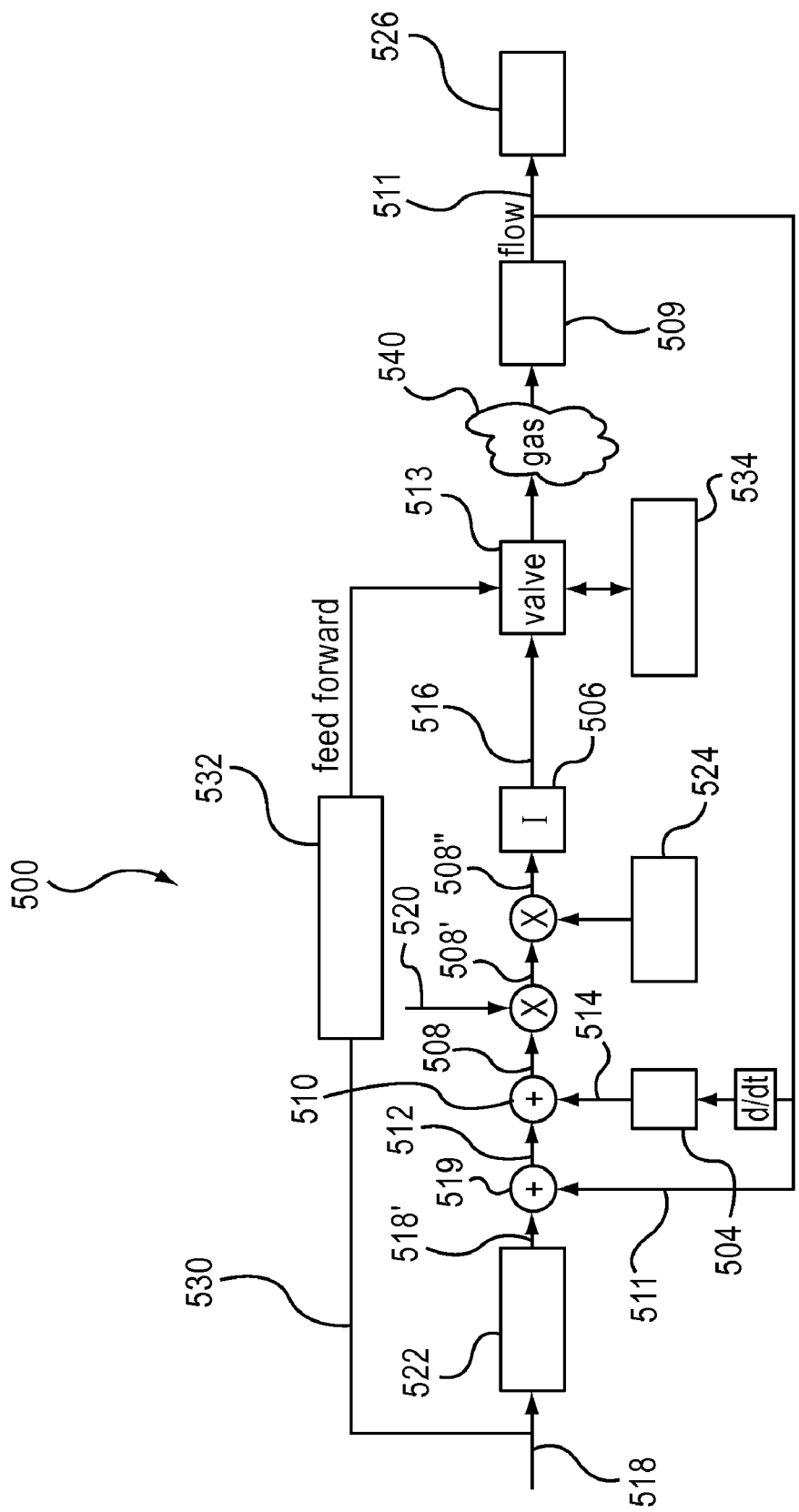
FIG. 5 is a schematic representation of a mass flow controller operation in accordance with another illustrative embodiment of the invention.

As seen in FIG. 5, a MFC 500 may also be comprised of a variable gain input 520, a setpoint conditioner 522, a noise reduction component 524, and a feedback filter 526. The variable gain input 520 may supply a variable gain to the control loop so that the MFC 500 provides a stable input to the valve 513. The variable gain input 520 therefore may allow for a more stable integral signal 516 across multiple flow conditions such as, but not limited to, multiple pressure values. The noise reduction filter 524 may be placed in various locations in the control loop seen in FIG. 5. In one location the noise reduction filter 524 may receive the combination signal 508' after the variable gain is implemented in order to slow down loop processing so that any noise in the combination signal 508" output by the noise reduction filter 524 is reduced, thereby creating a more accurate adjustment of the valve 513. The setpoint conditioner 522 is adapted to modify the setpoint signal 518 and the modified setpoint signal 518' may be received by the first adder 519 in one embodiment. In FIG. 5, the setpoint conditioner 522 may modify the signal 518' so that the setpoint signal 518' may be properly processed. The first adder 519 may output an error signal 512 to a second adder 510, which may also receive the proportional signal 514 and output the combination signal 508.

Also seen in FIG. 5 is an embodiment of the mass flow controller 500 comprising a feed-forward control signal 530. The feed-forward control signal 530 is adapted to provide a control signal substantially directly to the valve 513 from the setpoint signal 518. The feed-forward control signal 530 is provided in some applications when a quicker valve 513 response to a flow rate change is desired than what is typically provided with the integral signal 516. A quicker response is occasionally desired because in the MFC 500 seen in FIG. 5, the proportional signal modifier 504 was moved from a location that the proportional signal modifier 504 would be located in a typical PI controller to the location in FIG. 5, which may cause a slower reaction time to a change in setpoint. In one embodiment, the feed-forward control signal 530 may comprise valve characterization data 532. The valve characterization data 532 may modify the feed-forward control signal 530, taking into account setpoint, pressure, fluid type, and other parameters. One embodiment may also comprise a hysteresis compensator 534 adapted to compensate for effects of hysteresis in the valve 513. One feed-forward control signal 530 and hysteresis compensator 534 may be similar to the feed-forward control signal 530 and compensator 534 found in U.S. patent application Ser. No. 12/356,661, entitled Mass Flow Controller Hysteresis compensation System & Method, assigned to Advanced Energy Industries, Inc., which is incorporated by reference in its entirety for all proper purposes. Upon receiving the integral signal 516 or the feed-forward control signal 530, the valve 513 is adapted to adjust the flow rate of the fluid 540, which may be a gas. The sensor 509, in turn, measures the actual flow rate of the fluid 540 and outputs the measured flow rate signal 511.

Figure 6:
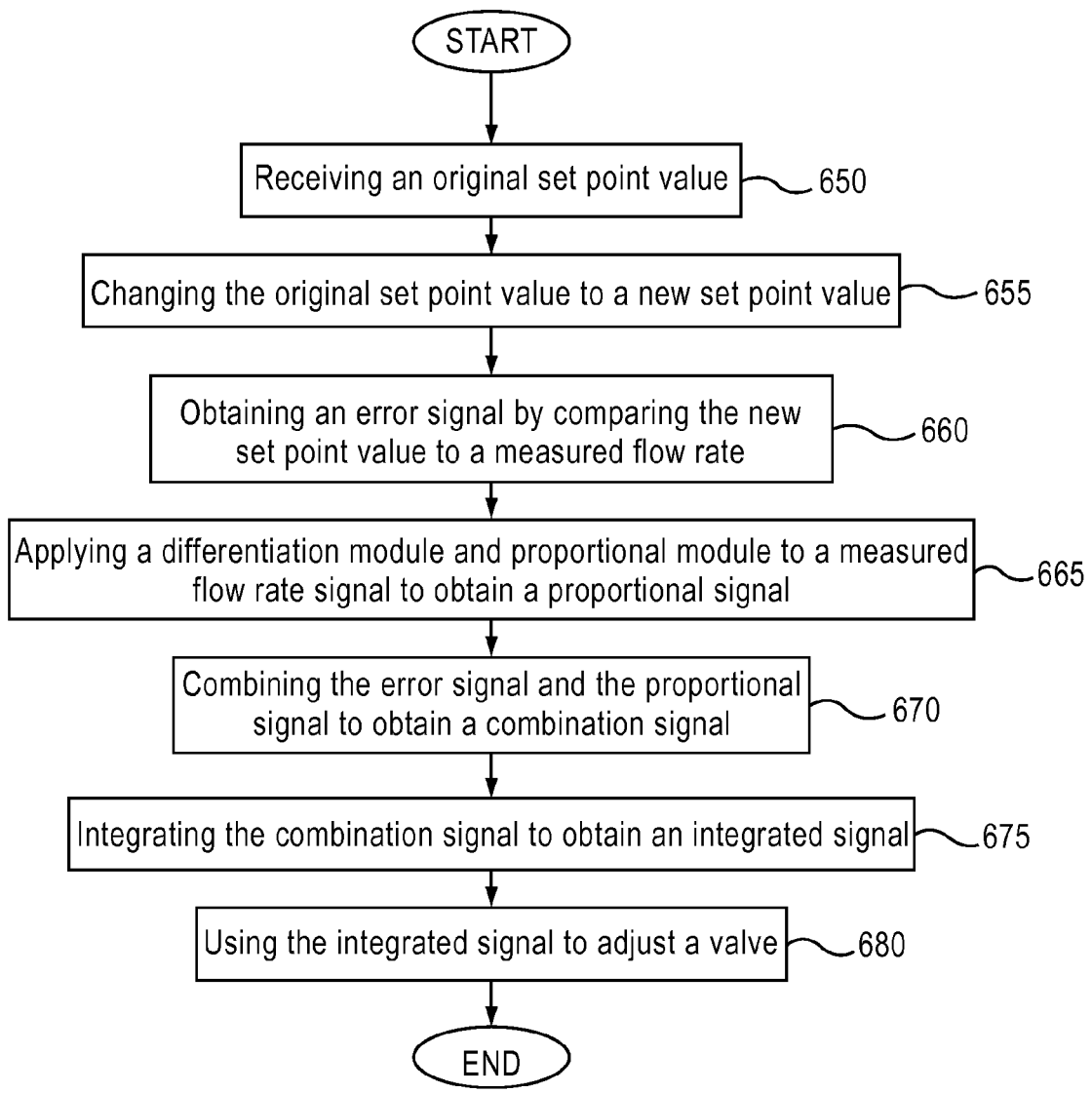
FIG. 6 is a representation of a method in accordance with an illustrative embodiment of the invention.

Turning now to FIG. 6, shown is a method of adjusting a flow rate of fluid in a mass flow controller such as, but not limited to, the mass flow controller 100 seen in FIG. 1. One method, at 650, comprises receiving an original set point value. For example, the original set point value may comprise a desired mass flow rate of a fluid flowing through the main flow line 129 of FIG. 1. The original set point value may be received by the controller 102 through a setpoint signal such as, but not limited to, the setpoint signal 218 as seen in FIG. 2. Returning now to FIG. 6, at 655, one method of adjusting a flow rate of a fluid in a mass flow controller 100 comprises changing the original set point value to a new set point value. Therefore, this may comprise changing the desired mass flow rate from an original desired mass flow rate value to a new desired mass flow rate value.

At 660, the method may further comprise obtaining an error signal such as, but not limited to, the error signal 212 seen in FIG. 2. The error signal 212 may be obtained by comparing the new set point value to a measured flow rate. For example, a controller 202 may receive a measured flow rate signal 211 from a sensor 209. The measured flow rate signal 211 may comprise an actual flow rate of fluid through the main flow line 129 and the controller 202 may be adapted to compare the actual flow rate to the new set point value, and determine a difference between the two. This difference may comprise the error signal 212.

At 665, one method comprises applying a differentiation module and a proportional module to a measured flow rate signal to obtain a proportional signal. For example, the differentiation module 217 seen in FIG. 2 may receive the sensor signal 211 and subsequently supply a modified measured flow rate signal 211' to a proportional modifier 204'. As the name suggests, the differentiation module 217 may apply differentiation to the measured flow rate signal, while the proportional modifier 204' may apply a proportional modification to the signal 211'.

At 670, one method further comprises combining the error signal 212 with a proportional signal 214 to obtain a combination signal 208. For example, as seen in FIG. 2, the error signal 212 may be combined with a proportional signal 214 as output by the proportional modifier 204' through a second adder 210 to create the combination signal 208. This combination signal 208 may be integrated at 675 of one method to obtain an integrated signal 216. The integral signal modifier 206 may apply the integration to the signal 208, outputting an integrated signal such as, but not limited to the integrated signal 216 shown in FIG. 2. Finally, at 680, the integrated signal 216 is used to adjust a valve 213 so that the flow rate of the fluid in the main flow line 229 more closely approximates the desired fluid flow rate in the set point signal 218 and prevents overshoot of the new set point value. In one method, upon a sensor such as, but not limited to, the sensor 209 shown in FIG. 2 measuring the actual fluid flow rate in the main flow line 229, and outputting a measured flow rate signal 211, the actual fluid flow rate substantially equals the new setpoint value.

Figure 3:
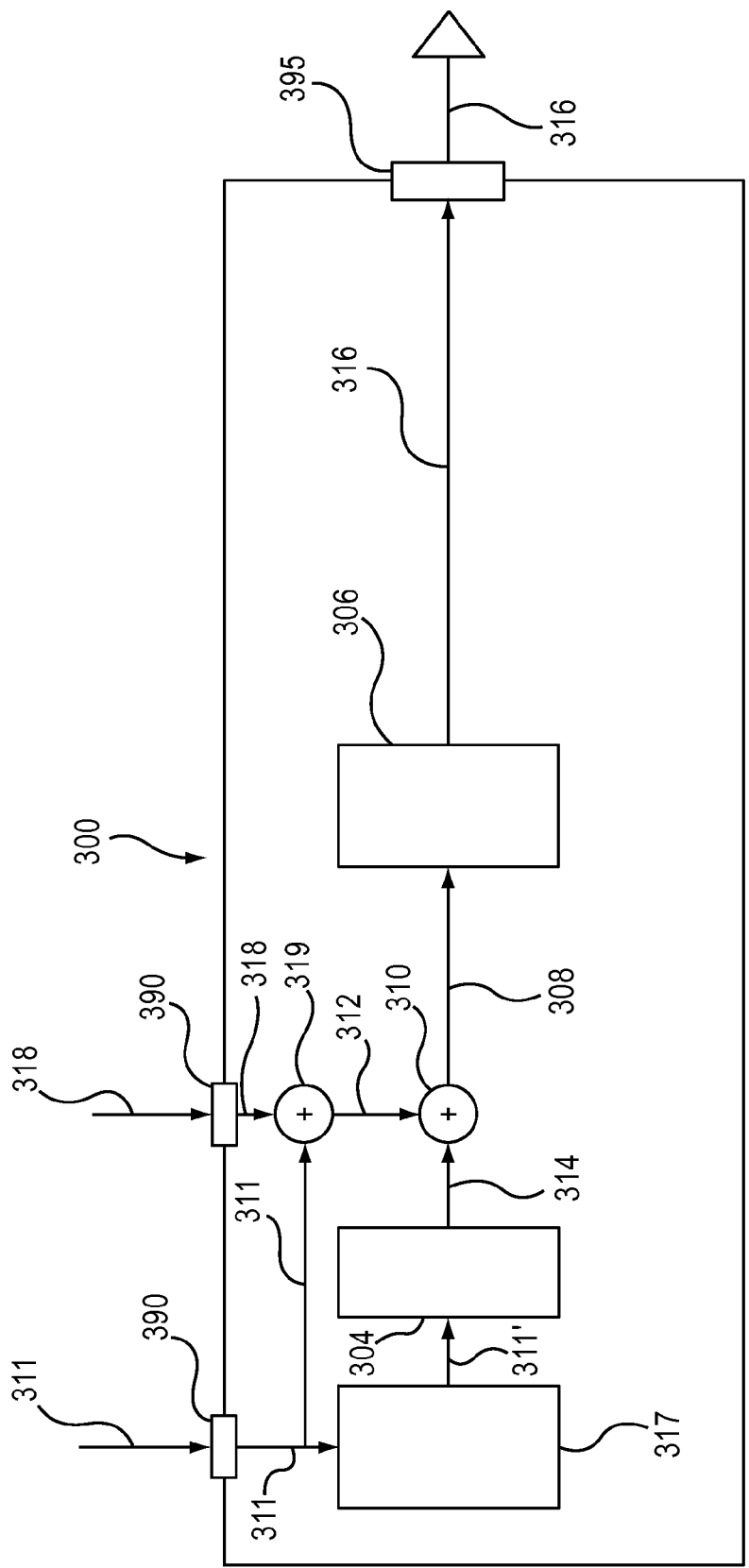
FIG. 3 is a schematic representation of a digital controller adapted to couple to a mass flow controller in accordance with an illustrative embodiment of the invention.

As seen in FIG. 3, one embodiment of the invention comprises a mass flow rate controller 300. One mass flow rate controller 300 comprises at least one input 390. For example, the controller 300 in FIG. 3 comprises two inputs 390. One input 390 may be adapted to receive a setpoint signal 318 while another input 390 may be adapted to receive a sensor signal such as, but not limited to, a measured flow rate signal 311. It is contemplated that one input 300 may receive more than one signal. Furthermore, the inputs 390 may be adapted to emit the signal or signals they receive without alteration.

As also seen in FIG. 3, one controller 300 is comprised of a proportional signal modifier 304 having a differentiation module 317. The differentiation module 317 may be separate from the proportional signal modifier 304 or it may be included in a single device in the controller 300. The differentiation module 317 is adapted to receive the sensor signal 311 and provide a differentiation modifier to the signal 311; the proportional signal modifier 304 is adapted to receive a modified sensor signal 311' and output a proportional signal 314.

The controller 300 in one embodiment is also comprised of a first signal adder 319 adapted to (i) receive the setpoint signal 318 and measured flow rate signal 311, and (ii) output an error signal 312. The controller 300 may also be comprised of a second signal adder 310 adapted to receive the error signal 312 and the proportional signal 314 and output a combination signal 308. The controller may also be comprised of an integral signal modifier 306 in-series with the proportional signal modifier 304, adapted to receive the combination signal 308 and output an integrated signal 316. Furthermore, the controller 300 may be comprised of an output 395 adapted to receive and output the integrated signal 316 from the controller 300. The integrated signal 316 may be adapted for receipt by a valve, such as, but not limited to, the valve 213 in FIG. 2. Through the use of the controller 300 in one embodiment, the actual mass flow rate fails to overshoot the setpoint as seen in FIG. 4.

In conclusion, embodiments of the present invention provide, among other things, a multi-mode control loop with improved performance for a mass flow controller. Those skilled in the art can readily recognize that numerous variations and substitutions may be made in the invention, its use, and its configuration to achieve substantially the same results as achieved by the embodiments described herein. Accordingly, there is no intention to limit the invention to the disclosed illustrative forms. Many variations, modifications, and alternative constructions fall within the scope and spirit of the disclosed invention as expressed in the claims.

What is claimed is:

1. A mass flow controller comprising,
a digital controller adapted to implement a control loop having a proportional signal modifier, including a differentiation module, in series with an integral signal modifier, the proportional signal modifier receives a measured flow rate signal and generates a proportional modifier output signal, the integral signal modifier being adapted to (i) receive a combination signal comprising an error signal and the proportional modifier output signal, and (ii) output an integrated signal;

a valve adapted to receive the integrated signal and adjust a valve opening in accordance with the integrated signal; and a sensor adapted to output the measured flow rate signal indicative of an actual fluid flow rate in the mass flow controller, the measured flow rate signal being (i) received by the proportional signal modifier, and (ii) used in conjunction with a setpoint signal to determine the error signal.

2. The mass flow controller of claim 1 wherein,
the setpoint signal comprises a desired fluid flow rate; and
the integrated signal is adapted to adjust the valve opening so that overshoot of the desired fluid flow rate is substantially prevented.

3. The mass flow controller of claim 1 wherein, upon a change in the setpoint signal from a first setpoint signal to a second setpoint signal, the actual fluid flow rate changes from a first setpoint value to a second setpoint value, the rate of change in actual fluid flow rate from first setpoint value to second setpoint value being substantially similar across multiple fluid operating conditions.

4. The mass flow controller of claim 3 wherein, the multiple fluid operating conditions comprises at least one of multiple pressures, fluids and setpoint values.

5. The mass flow controller of claim 3 wherein, the change from the first actual fluid flow rate to the second actual fluid flow rate occurs across a period of time which is substantially similar across varying first and second setpoint signals.

6. The mass flow controller of claim 1 further including,
a variable gain input adapted to supply a variable gain to the control loop;
a setpoint conditioner adapted to modify the setpoint signal;
a noise reduction component adapted to reduce noise in the combination signal; and
a feedback filter adapted to receive the measured flow rate signal.

7. The mass flow controller of claim 1, further including,
a feed-forward control adapted to provide a control signal substantially directly to the valve from a setpoint signal input; and
a hysteresis compensator adapted to compensate for hysteresis in the valve.

8. The mass flow controller of claim 1, wherein,
the sensor comprises a thermal sensing device; and further including,
a bridge circuit adapted to receive one or more thermal sensing device signals;
a differential amplifier adapted to receive a signal output by the bridge circuit;
an analog-digital converter adapted to receive a differential amplifier signal from the differential amplifier.

9. A method of adjusting a flow rate of fluid in a mass flow controller comprising,
receiving an original setpoint value;
changing the original setpoint value to a new setpoint value;
obtaining an error signal by comparing the new setpoint value to a measured flow rate;
applying a differentiation module and proportional module to a measured flow rate signal to obtain a proportional signal;
combining the error signal and the proportional signal to obtain a combination signal;
integrating the combination signal to obtain an integrated signal;
using the integrated signal to adjust a valve.

10. The method of claim 9, wherein the new setpoint value comprises a step change in the setpoint value.

11. The method of claim 10 wherein, using the integrated signal to adjust the valve prevents overshoot of the new setpoint value.

12. The method of claim 9 wherein,
the measured flow rate signal is output by a sensor; and
the measured flow rate substantially equals the new setpoint value.

13. A mass flow rate digital controller comprising,
at least one input adapted to receive a setpoint signal and a sensor signal;
a proportional signal modifier (i) having a differentiation module, (ii) adapted to receive the sensor signal, and (iii) output a proportional signal;
a first signal adder adapted to (i) receive the setpoint signal and sensor signal, and (ii) output an error signal;
a second signal adder adapted to (i) receive the error signal and proportional signal, and (ii) output a combination signal;
an integral signal modifier adapted to receive the combination signal and output an integrated signal;
an output adapted to output the integrated signal from the controller.

14. The mass flow rate digital controller of claim 13 wherein,
the setpoint signal comprises a desired mass flow rate;
the output is adapted to be received by a mass flow controller valve; and
the sensor signal comprises an actual mass flow rate.

15. The mass flow rate digital controller of claim 14 wherein, a control sequence is implemented to prevent the actual mass flow rate from overshooting the desired mass flow rate.

16. The mass flow rate controller of claim 13, further including,
a feed-forward controller; and
a valve hysteresis compensator.

17. The mass flow rate controller of claim 13, further including a variable gain input.

* * * * *

UNITED STATES PATENT AND TRADEMARK OFFICE
CERTIFICATE OF CORRECTION

| | | |
|---|---|---|
| PATENT NO. | : 8,195,312 B2 | Page 1 of 1 |
| APPLICATION NO. | : 12/549142 | |
| DATED | : June 5, 2012 | |
| INVENTOR(S) | : Smirnov et al. | |

It is certified that error appears in the above-identified patent and that said Letters Patent is hereby corrected as shown below:

On the title page, Item (75), the third Inventor's name should read Demetri Dax Widener.

Signed and Sealed this
Fifteenth Day of January, 2013

David J. Kappos
*Director of the United States Patent and Trademark Office*